United States Patent [19]

Giboney et al.

[11] Patent Number: 4,570,966
[45] Date of Patent: Feb. 18, 1986

[54] RETRACTABLE TRAILER HITCH BALL

[76] Inventors: George W. Giboney, Rte. 1, Hallsville, Mo. 65255; Robert E. Vanlandingham, 819 Crestland, Columbia, Mo. 65203; James L. Grimshaw, Rte. 7, Box 10, Columbia, Mo. 65202

[21] Appl. No.: 721,374

[22] Filed: Apr. 9, 1985

[51] Int. Cl.[4] .............................................. B62D 53/08
[52] U.S. Cl. .............................. 280/433; 280/491 B; 280/511
[58] Field of Search ............... 280/491 B, 433, 423 A, 280/423 R, 511

[56] References Cited

U.S. PATENT DOCUMENTS 3,574,363  4/1971  Stephenson ..................... 280/511
4,256,324  3/1981  Hamilton ........................ 280/511

Primary Examiner—Joseph F. Peters, Jr.
Assistant Examiner—Donn McGiehan
Attorney, Agent, or Firm—Shoemaker And Mattare, Ltd.

[57] ABSTRACT

A retractable hitch ball for "gooseneck" type trailers is housed as a self-contained unit beneath the bed of a towing truck such as a pick-up truck. A hydraulic cylinder controlled and operated from the cab of the truck moves an elevating block relative to a pivoted lifting plate which is biased downwardly by a spring. The hitch ball has a slotted connection with the pivoted lifting plate whereby it can be elevated and lowered vertically through a provided opening in the truck bed to active and inactive positions of the hitch ball. A closure plug for the truck bed opening is provided.

12 Claims, 5 Drawing Figures

RETRACTABLE TRAILER HITCH BALL

BACKGROUND OF THE INVENTION

Usually, in the prior art, hitch balls for "gooseneck" type trailers are permanently bolted or welded to the bed of a hauling truck, such as a pick-up truck. The hitch ball projects above the surface of the truck bed and creates a tripping hazard, and often damages cargo such as feed or fertilizer sacks. Additionally, up to one-third or more of the hauling space of the truck can be lost due to the hitch ball extending permanently above the surface of the truck bed. All of these objections to permanently installed non-retractable hitch balls are completely overcome by the present invention.

While some retractable hitch mechanisms are known in the prior art, these in general possess no actuating means other than the hands of the user to move the ball from an extended to a retracted position. The present invention completely eliminates such awkward practices by providing a retractable hitch ball and ball actuating mechanism which is remotely controlled hydraulically from the cab of the truck. Hydraulic lines are extended from the truck's power steering pump to a two-way hydraulic cylinder contained in the housing of the hitch ball extending and retracting mechanism secured under the truck bed.

Another significant advantage possessed by the invention is that the remotely controlled retractable hitch ball renders the operation of hitching and unhitching a gooseneck trailer much easier, safer and quicker. The retractable ball element is simply raised to its active use position and the truck is backed under the tongue of the trailer. A few turns of the dolly wheel crank completes the hook-up. To unhitch the trailer, it is merely necessary to set the dolly wheel at trailer-towing height, retract the hitch ball and move the truck forwardly. The invention virtually eliminates all cranking of the dolly wheel while under load.

A further important feature and object of the invention is to provide a retractable hitch ball arrangement of the type mentioned wherein the ball element can support a substantial load without damaging or overstressing any part of the ball extending and retracting mechanism. When the hitch ball is extended to the load bearing position, the weight borne by the ball is supported solidly by an elevating block or wedge element so that the hydraulic cylinder does not bear the load through internal fluid pressure. The arrangement is such that the hitch ball is securely locked in the extended use position and is biased to return automatically to its retracted position when the ball elevating block connected with the rod of the hydraulic cylinder is retracted. There is no strain on the hydraulic cylinder when the hitch ball is up or down.

Other objects and advantages of the invention will become apparent to those skilled in the art during the course of the following description.

DETAILED DESCRIPTION

Figures 1, 2:
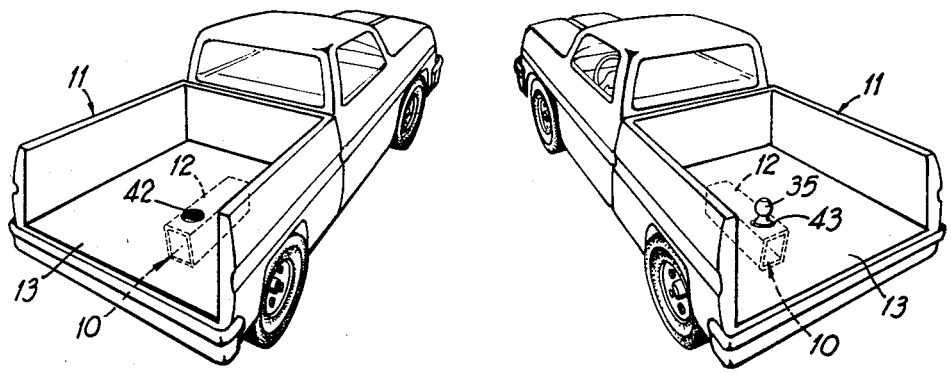
FIGS. 1 and 2 are perspective views of a retractable trailer hitch ball according to the present invention installed on a pick-up truck and showing, respectively, the retracted and extended positions of the hitch ball element.
Figure 3:
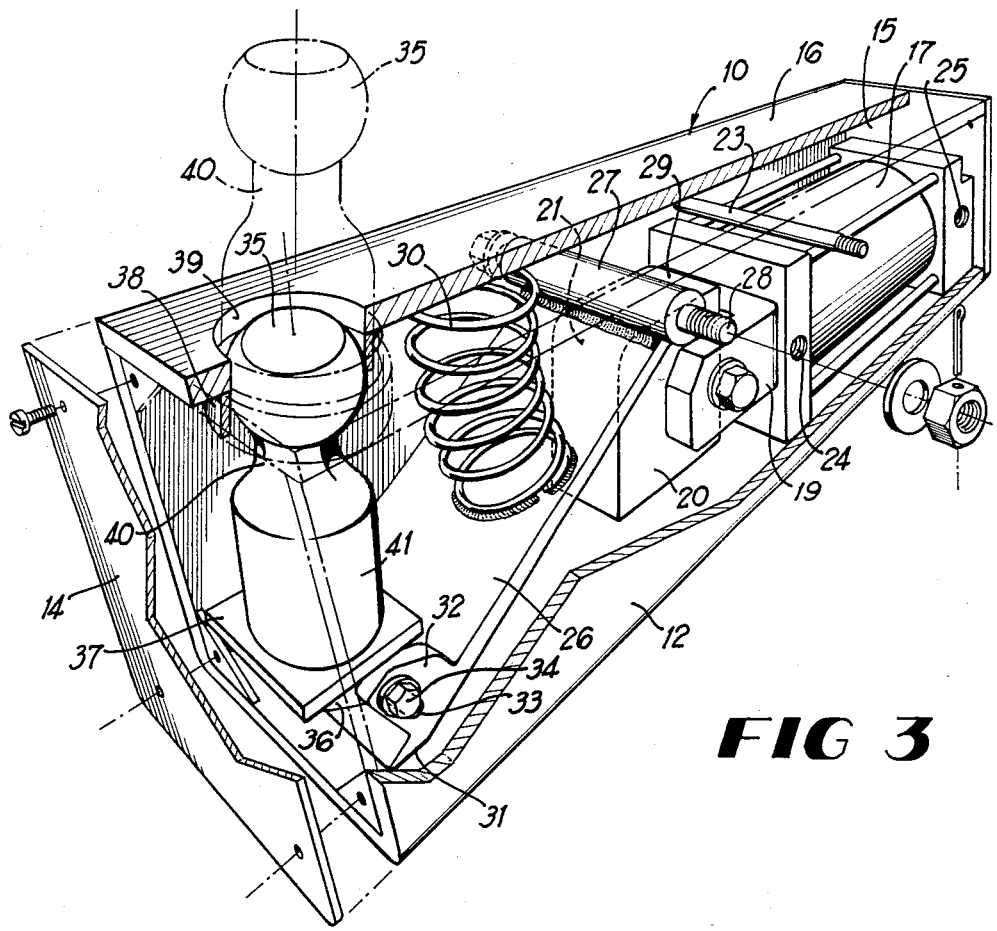
FIG. 3 is a partly exploded and partly cross sectional perspective view of the retractable hitch ball assembly according to the invention.

Referring to the drawings in detail wherein like numerals designate like parts, a retractable hitch ball assembly 10 according to the present invention is illustrated in FIGS. 1 and 2 as being installed on a conventional pick-up truck 11 of the type commonly used to haul any gooseneck-type trailer including utility trailers and campers.

The assembly 10 includes an elongated rectangular housing 12 which is securely welded or bolted permanently to the underside of the truck bed 13 somewhat centrally thereof. The longitudinal axis of the housing 12 extends lengthwise of the truck bed, as shown. The housing 12 includes detachable end walls 14 and 15 and may also have a detachable top wall 16, to facilitate installing and removing components from the housing 12 at required times. If preferred, the top wall 16 can be integrally joined to the side and bottom walls of the housing 12, in which case the internal components of the device may pass through the ends of the housing 12.

Within the housing 12 near one end thereof is a horizontal axis hydraulic cylinder 17 having an extensible and retractable rod 18 pivotally coupled through a head piece 19 with a hitch ball elevating and load bearing block 20 having a rounded upper forward corner 21 forming a camming surface. The flat bottom face of the block 20 slides on the flat bottom wall of the housing 12 during the operation of the apparatus.

The rear end of hydraulic cylinder 17 engages a positioning pad 22 provided on the removal end wall 15. A transverse horizontal hold-down bolt 23 for the cylinder body 17 extends across the top of the same and is received through openings in the two side walls of the housing 12.

The double acting hydraulic cylinder receives and discharges fluid through two ports 24 and 25 near its opposite ends and these ports are connected with hoses, not shown, which extend outwardly through openings in one side wall of the housing 12 and are connected to the truck's power steering pump, not shown. The operation of the hydraulic cylinder is controlled remotely from the cab of a truck by a conventional switching valve device, not shown.

An elongated flat elevator plate 26 has a pivot sleeve 27 fixed thereon near its rear end and this sleeve receives a supporting transverse pivot bolt 28 engaging through openings in the vertical side walls of the housing 12. The rear end portion of the pivoted elevator plate 26 lies above the rod 18 when the latter is extended, FIG. 5. The rear end of the plate 26 is supported at an elevation near the top of cylinder body 17.

The flat bottom face of the elevator plate 26 is slidably engaged by the arcuate corner 21 of block 20 which serves as a cam to elevate the plate 26 whenever the rod 18 is extended. When fully extended, FIG. 5, the flat top face portion 29 of the block 20 engages and supports the bottom face of the plate 26 in a substantially level mode, as shown in the drawings. The pivoted plate 26 is constantly biased downwardly to the position shown in FIG. 4 by a compression spring 30 interposed between the plate 26 and the housing top wall. In the biased position, a beveled face 31 on the leading end of the plate 26 contacts the housing bottom wall.

Near its leading end and on opposite sides thereof, the plate 26 carries a pair of upstanding spaced slotted lugs 32 whose elongated slots 33 receive a transverse horizontal pivot element 34 for the retractable hitch ball 35.

The hitch ball includes a base portion 36 disposed pivotally between the slotted lugs 32, the base portion 36 having a transverse opening receiving therethrough the pivot element 34. A lost motion pivotal connection is provided by the slots 33 and pivot element 34 between the elevator plate 26 and the hitch ball.

Above the base portion 36, the hitch ball carries a fixed square plate 37 which is adapted to abut the lower end of a stop ring 38 welded to the lower surface of the housing top wall 16 in coaxial relationship with an opening 39 formed through the top wall of sufficient size to allow the ball element 35 to pass freely therethrough. Between the ball element 35 and plate 37, the hitch ball includes a reduced neck 40 and a cylindrical body portion 41 approximating the diameter of the ball element 35.

Figure 4:
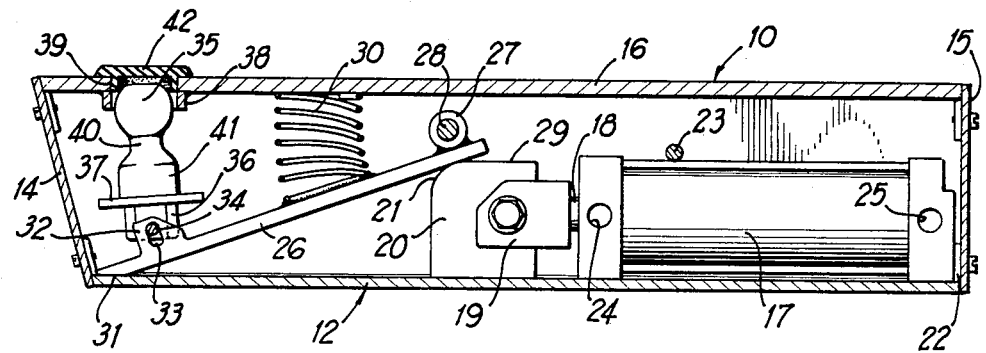
FIG. 4 is a longitudinal vertical cross section through the assembly showing the hitch ball in its retracted position.
Figure 5:
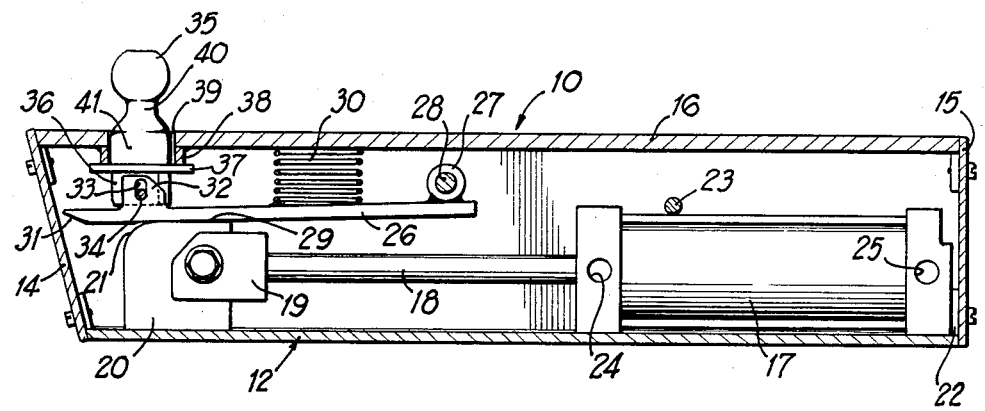
FIG. 5 is a view similar to FIG. 4 showing the hitch ball in the extended use position.

The lost motion pivotal connection of the elevator plate 26 with the hitch ball allows the latter to pass vertically upwardly and downwardly through the housing opening 39 between the extended and the retracted positions of the ball element 35, FIGS. 5 and 4. In the extended position, FIG. 5 and FIG. 2, the ball element 35 projects above the bed 13 of the truck 11 for ready coupling with a gooseneck trailer tongue. At this time, the plate 37 is in abutment with the ring 38 and is level, while the axis of the hitch ball is vertical. In the retracted position, FIG. 4, the ball element 35 is below the top face of the housing 10 and below the top surface of the truck bed 13.

The invention requires only the formation of a single opening through the truck bed 13 to receive the hitch ball, and when the hitch ball is retracted this opening is covered and protected by a substantially flush-mounted closure plug 42 of rubber or the like. This plug 42 is shown in FIG. 4 installed in the opening 39 by the manufacturer of the assembly 10 so that the plug will not be lost in shipment. When the assembly 10 is installed beneath the truck bed 13, the plug 42 is removed from the opening 39 and can then be placed in the truck bed opening 43, FIG. 2, which registers with the opening 39.

The retractable hitch ball assembly 10 has many virtues among which is its compactness and self-contained nature whereby it is easily installed as a unit on the bottom of the truck bed 13. An important feature of the device is the ability of the block 20 to support the full weight bearing on the ball element 35 when the latter is extended, FIG. 5. This ability relieves the hydraulic cylinder from the strain of supporting any major weight. The hitch ball is essentially locked by the block 20 in the extended position and is also held steady in the down or retracted position by the spring 30. The block 20 is always in contact with the bottom face of the plate 26 in all positions of the mechanism.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A retractable hitch ball assembly comprising a housing adapted to be fixed to the bottom side of a truck bed adjacent to a hitch ball clearance opening in such bed, an elevator plate for a hitch ball pivotally mounted for vertical swinging movement in said housing, a hitch ball having a lost motion pivotal connection with the elevator plate in said housing and extending above the elevator plate, the housing having a hitch ball clearance opening formed in its top wall through which the hitch ball can be extended or retracted by the swinging movement of the elevator plate, and a remotely operated linear actuator means in said housing including a cam-like elevating and load bearing block element adapted to slide under the elevator plate and traverse the elevator plate in opposite directions to raise and lower the elevator plate with said hitch ball.

2. A retractable hitch ball assembly as defined in claim 1, and a biasing spring within said housing and bearing downwardly on the elevator plate and depressing it on its pivot toward the bottom wall of the housing to maintain the hitch ball retracted in said housing.

3. A retractable hitch ball assembly as defined in claim 1, and the linear actuator means comprising a substantially horizontal axis hydraulic cylinder having an extensible and retractable rod connected with said block element, and the block element having sliding engagement with the bottom face of said elevator plate and sliding engagement with the bottom wall of said housing.

4. A retractable hitch ball assembly as defined in claim 3, and said elevator plate having a substantially flat bottom surface and said block element having an arcuate upper leading corner engaging the bottom surface of the elevator plate with a camming action.

5. A retractable hitch ball assembly as defined in claim 4, and the block element having a substantially level top face rearwardly of said arcuate corner and a parallel flat bottom face, whereby the block element can stably support a substantial load transmitted to it through the hitch ball while the block element and hitch ball are in extended positions with the block element in general vertical alignment with said hitch ball.

6. A retractable hitch ball assembly as defined in claim 1, and a stop ring depending from the top wall of said housing adjacent to the hitch ball clearance opening, and a cooperative plate on the hitch ball adapted to abut said stop ring to position and lock the hitch ball in its extended use position.

7. A retractable hitch ball assembly as defined in claim 1, and said lost motion pivotal connection comprising slotted lugs on said elevator plate adapted to receive between them a base portion of the hitch ball having a pivot opening, and a pivot element extending through said pivot opening and through the slots of said lugs, said lugs being disposed near one end of the elevator plate away from the pivot axis of the elevator plate.

8. A retractable hitch ball assembly as defined in claim 1, and said housing being elongated and having at least a detachable end wall, said elevator plate and hitch ball being disposed within one end portion of the housing, and said linear actuator means being disposed within the other end portion of the housing, the pivot axis of the elevator plate being located near the longitudinal center of the housing and near the top of the linear actuator means.

9. A retractable hitch ball assembly adapted for mounting on the bed of the hauling truck for gooseneck trailer vehicles, comprising a housing having a top wall opening near one end thereof, an elevator plate within the housing below said top wall opening and having one end thereof pivotally attached to side walls of the housing whereby the other end of the elevator plate may be swung vertically toward and away from said top wall opening, a hitch ball unit pivotally connected with said other end of the elevator plate and extending above the elevator plate and adapted to enter and pass through said top wall opening when said other end of the elevator plate is raised, means in said housing resiliently biasing the elevator plate toward a downward inclined position where said other end of the elevator plate engages a bottom wall of the housing and said hitch ball unit is retracted inside of said housing, and a remotely controlled linear actuator disposed in said housing in an end portion thereof away from said elevator plate and including a lifting and weight supporting block element which cammingly engages the bottom of said elevator plate and slidably engages the bottom wall of said housing.

10. A retractable hitch ball assembly as defined in claim 9, and said linear actuator comprising a fluid pressure operated double acting power cylinder having an extensible and retractable rod coupled with said block element.

11. A retractable hitch ball assembly as defined in claim 9, and said elevator plate comprising a flat elongated plate and said block element having a forward upper rounded corner forming a cam face and a level surface rearwardly of said cam face, said block element having a level bottom face.

12. A retractable hitch ball assembly as defined in claim 9, and said hitch ball unit including an upper ball element, an intermediate cylindrical body portion and a base portion which is pivotally connected with said other end of the elevator plate through a slotted pivotal connection, and engageable stop and positioning elements for the hitch ball unit on the hitch ball unit and on the top wall of the housing.

* * * * *